J. O'CONNOR.
VALVE.
APPLICATION FILED FEB. 18, 1908.

910,844.

Patented Jan. 26, 1909.

Witnesses

Inventor
John O'Connor,
James J. Sheehy
Attorney

UNITED STATES PATENT OFFICE.

JOHN O'CONNOR, OF CLIFTON, NEW YORK.

VALVE.

No. 910,844.

Specification of Letters Patent.

Patented Jan. 26, 1909.

Application filed February 18, 1908. Serial No. 416,601.

*To all whom it may concern:*

Be it known that I, JOHN O'CONNOR, citizen of the United States, residing at Clifton, Staten Island, in the county of Richmond and State of New York, have invented new and useful Improvements in Valves, of which the following is a specification.

My invention relates to valves; and it has for one of its objects to provide a valve constructed with a view of permitting of the valve seat and the valve stem nut as well as the valve body and the valve stem being readily removed when worn or otherwise deteriorated and as readily replaced with new elements of corresponding character.

Another object of the invention is the provision of a valve comprising a main conduit, a valve body for controlling said conduit, a drain passage for leading water from the main conduit, and a valve controlling the drain passage and arranged to be opened by the valve body when the latter is closed and to be closed by the pressure of water or other fluid when the valve body is opened.

Figure 2:
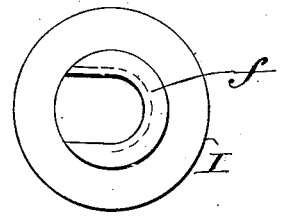
Figure 1:
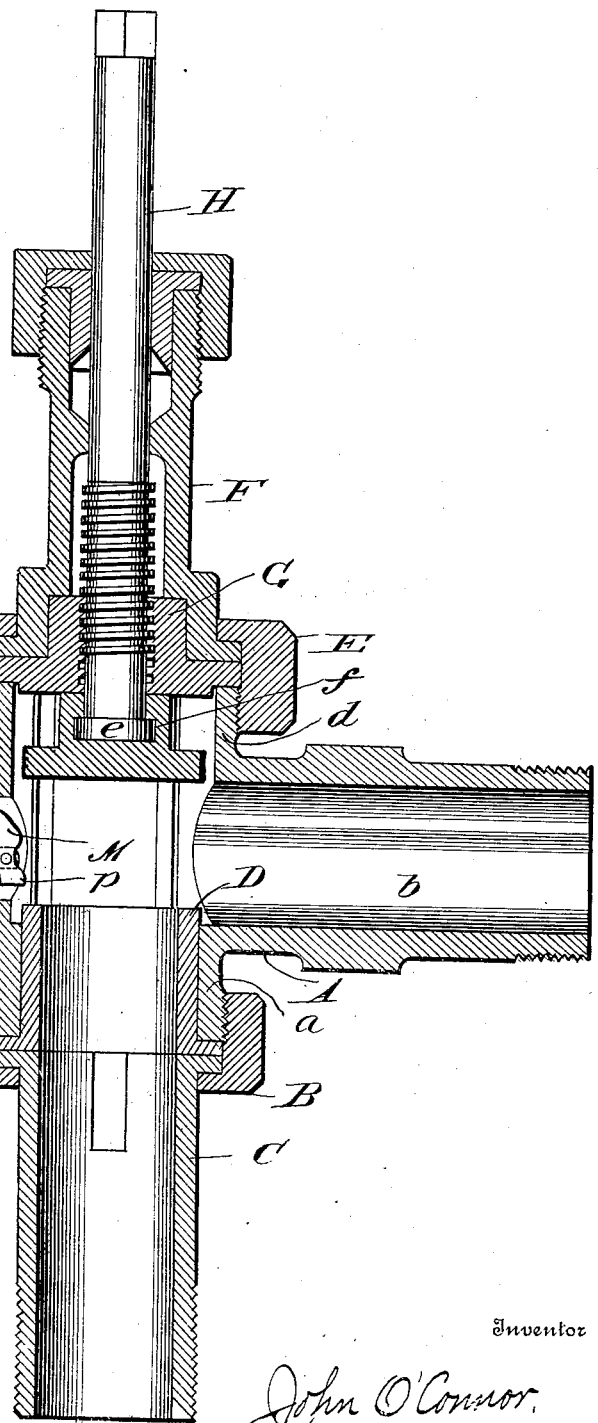
Figure 3:
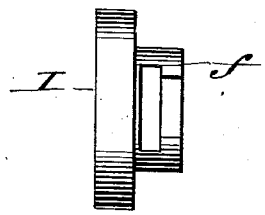

With the foregoing in mind the invention will be fully understood from the following description and claim when the same are read in connection with the drawings, accompanying and forming part of this specification, in which:

Figure 1 is a vertical section illustrating the valve constituting the best practical embodiment of my invention known to me. Fig. 2 is a plan view of the valve body, removed. Fig. 3 is a side elevation of the said valve body.

Similar letters designate corresponding parts in all of the views of the drawings, referring to which:

A is the casing of my novel valve, which is provided with an arm $a$ for connection with a source of water or steam supply and is also provided with a discharge arm $b$, a short arm $c$ arranged diametrically opposite the arm $b$, and an upwardly extending portion $d$. The arm $a$ of the casing is exteriorly threaded for the engagement of a flanged nut B, and between the flange of the said nut and the end of the arm $a$ the opposed flanges of a pipe section C and a brass valve seat D are interposed. By virtue of this construction it will be manifest that on removal of the nut B the valve seat D may be expeditiously and easily taken from the casing and a new valve seat may be as readily placed and secured in the casing with a view of prolonging the usefulness of the valve as a whole. The upwardly extending portion $d$ of the casing is exteriorly threaded for the engagement of a flanged bonnet nut, and between the flange of the said nut E and the upper end of the casing portion $d$ the flange of a bonnet F and the flange of a valve stem nut G are interposed, whereby it will be seen that subsequent to the removal of the bonnet nut E the valve stem nut G may be readily removed and if worn or otherwise deteriorated may be readily replaced with a new valve stem nut. In this connection it will also be noticed that when occasion demands either the valve stem H or the valve body I may be replaced with a new part of corresponding character; the valve stem being removable from the nut G and the valve body I being detachably connected to the stem in the manner illustrated— *i. e.*, by the arrangement of the head $e$ at the lower end of the stem H in the receiver $f$ on the valve body I, which receiver has an opening at one side and a contracted passage for the stem H, whereby the body I may be moved laterally off the stem when the body and stem are taken from the casing, and a new body may be similarly placed on the stem. It will be noticed, however, that when the valve body and stem are positioned in the casing, the body will move up and down with the stem without liability of becoming disconnected therefrom.

The comparatively short arm $c$ of the casing A is for the reception of a flanged plug J which is removably held in position by a flanged nut K and is provided with a drain passage $l$ and with an inclined valve seat $m$. The drain passage $l$ is controlled by a valve M having a tail $p$, and because of the valve seat $m$ being inclined it will be noted that the valve M will gravitate to its closed position shown in Fig. 1 and will be held in such position by the pressure of fluid in the casing. It will also be observed that when the main valve body I is closed it will act against the tail of the drain valve M and by so doing will open the valve M and hold the said valve in an open position so as to enable fluid to drain from the casing through the passage $l$. Immediately subsequent to the opening of the main valve body I to permit fluid to pass from the arm $a$ to the arm $b$ of the casing, the drain valve M will be closed and kept closed in the manner before described.

As will be readily understood from the foregoing my novel valve is designed to be used to advantage as a boiler blow-off valve and is also adapted to be used to advantage as a water hydrant valve for underground mains, the pipe section C in the latter use being connected with the main (not shown), and the casing arm $b$ being connected through suitable means with a hydrant (also not shown). When the valve is used for the last mentioned purpose it will be noted that when the main valve body I is closed the drain valve M will be open, this latter to permit water to drain from the casing A and the pipe between said casing and the hydrant through the passage $l$ and in that way prevent freezing.

As before stated, the construction herein illustrated and described constitutes the best embodiment of my invention of which I am cognizant, but I would have it understood that in the future practice of the invention such changes or modifications may be made as fairly fall within the scope of my invention as defined in the claim appended.

Having described my invention, what I claim and desire to secure by Letters-Patent, is:

A valve comprising a casing containing a valve seat and having a threaded portion $d$ and also having an induction orifice and an eduction orifice, the former being located below the valve seat, and further having a drain passage disposed above and at an angle to the valve seat, and an upwardly and outwardly inclined valve seat at the inner end of said drain passage, a valve stem nut having a flange arranged against the outer end of the threaded portion $d$ of the casing, a bonnet having a flange arranged against and separable from the outer side of the flange of the valve stem nut, a bonnet-nut interiorly threaded and mounted on the said threaded portion $d$ and having an inwardly directed flange arranged against the outer side of the flange of the bonnet-nut and adapted to clamp said flange against that of the valve stem nut, a threaded valve stem removably arranged in the valve stem nut, a valve body detachably connected to the stem and movable rectilinearly in the casing toward and from the valve seat and past the drain passage and the inclined valve seat thereof, and a vertically swinging drain valve fulcrumed at an intermediate point of its length and having an upper, comparatively heavy arm adapted to gravitate against the inclined valve seat, and also having a tail disposed in the path of the valve body, whereby when the body is lowered it operates directly against the tail of the latter to open the drain valve, and when the body is raised, the drain valve is adapted to gravitate to a closed position.

In testimony whereof I have hereunto set my hand in presence of two subscribing witnesses.

JOHN O'CONNOR.

Witnesses:
J. H. CLARK,
HARRY LAWRENCE.